(12) United States Patent
Sundaramoorthy et al.

(10) Patent No.: US 11,864,074 B2
(45) Date of Patent: Jan. 2, 2024

(54) USER CONFIGURATION OF SERVICES

(71) Applicant: Telefonaktiebolaget LM Ericsson (publ), Stockholm (SE)

(72) Inventors: Vallabhee Sundaramoorthy, Chennai (IN); Arunkumar K, Chennai (IN); Meenakshi Sundaram Govindassamy, Chennai (IN); RamKumar N, Chennai (IN); Shalini Sundaramurthy, Chennai (IN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 376 days.

(21) Appl. No.: 17/415,659

(22) PCT Filed: Dec. 19, 2018

(86) PCT No.: PCT/IN2018/050855
§ 371 (c)(1),
(2) Date: Jun. 17, 2021

(87) PCT Pub. No.: WO2020/129073
PCT Pub. Date: Jun. 25, 2020

(65) Prior Publication Data
US 2022/0046399 A1    Feb. 10, 2022

(51) Int. Cl.
*H04W 8/18*    (2009.01)
*H04W 4/50*    (2018.01)
*G06F 17/18*   (2006.01)

(52) U.S. Cl.
CPC .............. *H04W 4/50* (2018.02); *G06F 17/18* (2013.01); *H04W 8/18* (2013.01)

(58) Field of Classification Search
CPC .................................. H04W 4/50; H04W 8/18
See application file for complete search history.

(56) References Cited

U.S. PATENT DOCUMENTS 7,649,935 B2 * 1/2010 Song .................... H03F 1/3223
                                                       363/21.01
10,129,109 B2  11/2018 Jayanti Venkata et al.
(Continued)

FOREIGN PATENT DOCUMENTS

CN    101192922 A    6/2008
CN    105453128 A    3/2016
(Continued)

OTHER PUBLICATIONS

International Search Report and Written Opinion of the International Searching Authority, PCT/IN2018/050855, dated Feb. 28, 2019, 11 pages.
(Continued)

*Primary Examiner* — Michael T Vu
(74) *Attorney, Agent, or Firm* — Sage Patent Group (57) ABSTRACT

A method for determining user configurations of services in a radio communication network is performed in a support system node, and includes ranking users of a service based on frequency of occurrences of user reconfiguration in the radio communication network, creating a linear regression model of user configuration for a plurality of users of the service in the radio communication network, identifying a user configuration per user of the service for a selected number of ranked users by fitting the selected number of ranked users in the linear regression model, in order to reduce user reconfiguration of the service, and providing the identified user configuration per user to the selected number of ranked users. A support system node, a computer program and a computer program for determining user configurations of services in a radio communication network are also presented.

19 Claims, 3 Drawing Sheets

(56) References Cited

U.S. PATENT DOCUMENTS

2015/0341211 A1\* 11/2015 Saha .................. H04W 88/08
                                                        709/221
2016/0205126 A1    7/2016 Boyer et al.
2017/0207985 A1    7/2017 Jayanti Venkata et al.
2020/0409961 A1\* 12/2020 Arunmozhi ....... G06F 16/24578

FOREIGN PATENT DOCUMENTS

CN    108764663 A    11/2018
EP      2807835 B1    6/2018

OTHER PUBLICATIONS

Office Action dated Jul. 28, 2023 for Chinese Application No. 201880100333.8, 5 pages.
Search Report dated Jul. 28, 2023 for Chinese Application No. 201880100333.8, 2 pages.
Extended European Search Report, EP 18943829.4, dated Nov. 2, 2021, 8 pages.

\* cited by examiner

USER CONFIGURATION OF SERVICES

CROSS REFERENCE TO RELATED APPLICATIONS

This application is a 35 U.S.C. § 371 national stage application of PCT International Application No. PCT/IN2018/050855 filed on Dec. 19, 2018, the disclosure and content of which is incorporated by reference herein in its entirety.

TECHNICAL FIELD

The present disclosure relates to a method, a system support node, a computer program and a computer program product for determining user configurations of services in a radio communication network.

BACKGROUND

Customers in a telecommunication, prepaid or post-paid, systems can select products which are of a plan type, a subscription type or a package of different services. These products are often bundled with services such as voice, data, short message service (SMS) and other services. The products are also defined with a fee, service usage limits, additional offers, discounts and more. These packages or plans are created by the operators by doing market analysis, customer segmentation and offered to the customers with the intention to meet customer expectation.

But it is not always guaranteed that the products provide good customer experience for all customers. One of the important reasons for dissatisfied telecommunication customers is related to rate plans. Customers may not find an appropriate rate plan that can fit their needs. At the same time, telecommunication operators are not targeting every segment of customers and launching rate plans tailored based on individual's needs. This subsequently leads to customer switching providers, switching rate plans, or revenue loss as customer look for alternate options.

One problem is thus that dissatisfied customers not finding suitable products that fit their need change operator or change rate plan, which will lead to user reconfiguration of services in radio communication networks.

SUMMARY

One objective is to make available a method that can provide user configurations that lead to reduced reconfiguration of services in a radio communication network. According to a first aspect there is presented a method for determining user configurations of services in a radio communication network. The method is performed in a support system node, and comprises ranking users of a service based on frequency of occurrences of user reconfiguration in the radio communication network, creating a linear regression model of user configuration for a plurality of users of the service in the radio communication network, identifying a user configuration per user of the service for a selected number of ranked users by fitting the selected number of ranked users in the linear regression model, in order to reduce user reconfiguration of the service, and providing the identified user configuration per user to the selected number of ranked users.

By the presented method, a user configuration per user of a service is identified by fitting a selected number of ranked users in a linear regression model, whereby user reconfiguration of the service is reduced.

According to an embodiment of the first aspect, the method further comprises selecting a number of users based on the ranked frequency of occurrences. The selecting step may be performed in an analyser unit.

According to another embodiment, freely combinable with any of the above aspects and embodiments the services are product offerings.

According to another embodiment, freely combinable with any of the above aspects and embodiments, the linear regression model is created for user configuration for all users of the service in the radio communication network.

According to another embodiment, freely combinable with any of the above aspects and embodiments, the frequency of occurrences is obtained from a business support system.

According to another embodiment, freely combinable with any of the above aspects and embodiments, the ranking step is performed in an analyser unit.

According to another embodiment, freely combinable with any of the above aspects and embodiments, the creating and identifying steps are performed in a user configuration engine.

According to another embodiment, freely combinable with any of the above aspects and embodiments, the providing step sends the identified user configuration per user to a service generator for transmission to the selected users.

According to a second aspect there is presented support system node for determining user configurations of services in a radio communication network. The support system node comprises a processing circuitry and a computer program product storing instructions that, when executed by the processing circuitry, causes the support system node to rank users of a service based on frequency of occurrences of user reconfiguration in the radio communication network, create a linear regression model of user configuration for a plurality of users of the service in the radio communication network, identify a user configuration per user of the service for a selected number of ranked users by fitting the selected number of ranked users in the linear regression model, in order to reduce user reconfiguration of the service, and to provide the identified user configuration per user to the selected number of ranked users.

According to an embodiment of the second aspect, the support system node is further caused to select a number of users based on the ranked frequency of occurrences.

According to another embodiment, freely combinable with any of the second aspect and embodiments, the services are product offerings.

According to another embodiment, freely combinable with any of the second aspect and embodiments, the linear regression model is created for user configuration for all users of the service in the radio communication network.

According to another embodiment, freely combinable with any of the second aspect and embodiments, the frequency of occurrences is obtained from a business support system.

According to another embodiment, freely combinable with any of the second aspect and embodiments, the ranking step is performed in an analyser unit. The select step may be performed in an analyser unit.

According to another embodiment, freely combinable with any of the second aspect and embodiments, the create and identify steps are performed in a user configuration engine.

According to another embodiment, freely combinable with any of the second aspect and embodiments, the provide step sends the identified user configuration per user to a service generator for transmission to the selected users.

According to a third aspect there is presented a computer program for determining user configurations of services in a radio communication network. The computer program comprises computer program code which, when run in a support system node, causes the support system node to, rank users of a service based on frequency of occurrences of user reconfiguration in the radio communication network, create a linear regression model of user configuration for a plurality of users of the service in the radio communication network, identify a user configuration per user of the service for a selected number of ranked users by fitting the selected number of ranked users in the linear regression model, in order to reduce user reconfiguration of the service, and to provide the identified user configuration per user to the selected number of ranked users.

A computer program product comprising a computer program and a computer readable storage means on which the computer program is stored is also presented.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

An example of how a user may act is presented, which will induce user reconfigurations of a service.

A user A is currently working on his thesis and he finds his data needs are increased. The user's current prepaid telecommunication plan is with free units on voice and he plans to switch plan.

The user A then activates data plan 1-100 GB data free for INR 500. After a while user A finds that 100 GB is not enough to cater to his needs, and after he has used the free 100 GB he spends more INR for every used GB more than 100 GB.

The user A then activates data plan 2-100 GB free for INR 500 and reduced speed after that. His is however not able to work with reduced speed.

The user A then activates data plan 3-300 GB free for INR 750 with added voice units. This plan has increased his monthly spend and he is not happy to spend more for data plan with additional voice units that will never be used.

The user A has thus in a short period of time reconfigured his user configuration for the voice and data service, and will likely change his telecommunication plan soon again, resulting in yet another reconfiguration of his user configuration in the telecommunication network. Similarly if the user didn't find the service which suits his need, he may switch operator instead of only switching his telecommunication plan due to dissatisfaction with the current operator, again leading to reconfiguration in the telecommunication network.

By providing a method for enabling an optimal user configuration for a service, a reduced number of reconfigurations is achieved, and the customer experience is also improved.

Figure 1:
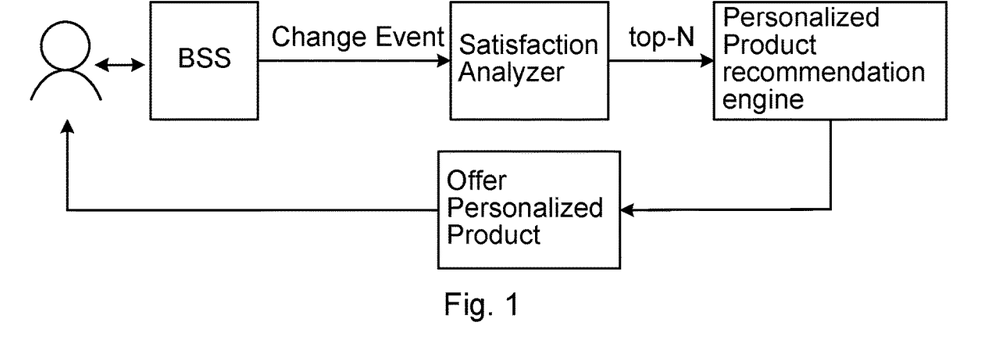
FIG. 1 is a schematic diagram illustrating an environment wherein embodiments presented herein can be applied.

FIG. 1 illustrates components used for an embodiment of a method for providing personalized user configurations presented herein.

The embodiment comprises a business support system (BSS), a satisfaction analyser, a personalized product recommendation engine, a component which can provide a personalized product to a user. The satisfaction analyser, the personalized product recommendation engine, and the component which can provide a personalized product to a user, may be functions within the BSS or functions in separated nodes in a radio communication system.

The BSS is a system support node in the radio communication system, following the 3rd Generation Partnership Project (3GPP) standard. The BSS has knowledge of a user's rate plan change events. The rate plan change events can be used by the satisfaction analyser.

The satisfaction Analyser is responsible for collecting, processing of the product (package/plan) change event from the Business Support System (BSS) for a predefined period. The main functionality of this component is to identify dissatisfied customers based on the frequency of plan changes. The satisfaction analyser can rank the number frequency of plan changes for all the users in the BSS, and select a top number N of users, which can be provided to the personalized product recommendation engine.

The personalized product recommendation engine customizes or personalizes as per the individual use usage and needs.

The last component provide offers of the personalized product to the user, which may be through channels such as interactive voice response (IVR), user portals, or notification systems. It is also responsible for creating and assigning the customized product when the user accepts the same.

The embodiment has the following phases: identification of a dissatisfied user based on the rate plan changes, identification of a personalized rate plan based on usage behaviour, and offering of a personalized product to the user.

Identification of a dissatisfied user based on the rate plan changes comprises the following. For every plan change by the user, a user change event is generated in the BSS and sent to the satisfaction analyser. If a user has made a rate plan switch in a billing cycle he may further be fed into an analysing module. Change event data may be used along with the pattern of the change and the frequency of change duration to identify a segment of the users. The rate plan switch may be used to classify the user. The analysing module contains a customized algorithm to rank the frequency of occurrence of his rate plan change in combination with the usage/limit ratio of a current rate plan, to rank the user with most dissatisfaction in the top. This is represented in the following mathematical model, Ranked dissatisfied user $C_{1\ldots n}$=rank $(1-\{(\Delta P*U/L)*1/10^M\})$ where n—top number of dissatisfied customer.

t—change event time period for all customers $\Delta P$—average of the mean time between plan changes U/L—usage to limit ratio M–10 MOD $(\Delta P*U/L)$.

Figure 2:
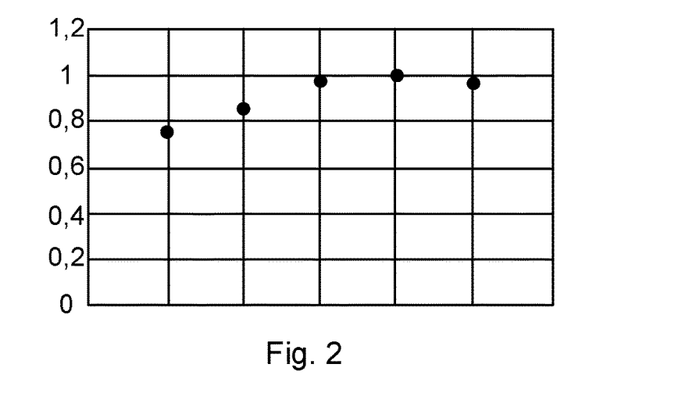
FIG. 2 is a schematic diagram illustrating a dissatisfied customer rank.

The mathematical model provides, when applied to the BSS events for a defined time period, the top-N dissatisfied users, where N is an operator configured value. The mathematical model applied to a sample dataset is depicted in the FIG. 2, wherein it can be seen that the dissatisfied customers are ranked based on the above parameters.

Identification of the personalized rate plan based on the usage behaviour comprises the following two steps in the personalized product recommendation engine.

In step 1 a linear regression learning model is built for the entire user data of an operator, considering only the usage and cost per unit across all services.

The linear regression formula is based on the following:

$$a = \frac{(\sum y)(\sum x^2) - (\sum x)(\sum xy)}{n(\sum x^2) - (\sum x)^2}$$

$$b = \frac{n(\sum y) - (\sum x)(\sum y)}{n(\sum x^2) - (\sum x)^2}$$

$$R^2 = \frac{(Nxy_{sum} - x_{sum}y_{sum})^2}{(Nx_{sum}^2 - x_{sum}x_{sum})(Ny_{sum}^2 - y_{sum}y_{sum})}$$

The linear regression is Y=bX+a, where

X is the sum of service usage units per month,

Y is the cost per unit, a is the Y-intercept, which is the expected mean value of y when all x variables are equal to 0. On a regression graph, it's the point where the line crosses the Y axis, b is the slope of a regression line, which is the rate of change for y as x, and $R^2$ is the coefficient of determination, which is used as an indicator of the goodness of fit. It shows how many points fall on the regression line. The $R^2$ value is calculated from the total sum of squares, or more precisely, it is the sum of the squared deviations of the original data from the mean.

Based on R2, values may be adjusted in order to optimally fit or skew the results according to a telecommunication operator needs, e.g. not too low or too high price recommendations.

In step 2, the identified users $C_{1\ldots n}$ (t) are fitted into the learned model to find the personalized cost per service unit.

In an example of the identification of a dissatisfied user, a small sample set is illustrated in connection with FIG. 3. The example depicts the customer usage against the cost per minute by applying the linear regression to the sample data set. Only voice service is considered here, but it can be extended to any service.

The table below contains the usage in minutes for all customers having different packages, hence resulting in different costs per minute.

| Minutes Usage(x) | Cost per minutes (y) |
|---|---|
| 1000 | 0.5 |
| 900 | 1 |
| 800 | 2 |
| 700 | 3 |
| 600 | 3 |
| 500 | 3.5 |
| 400 | 3.5 |
| 300 | 4 |
| 200 | 4 |
| 100 | 4.5 |
| 50 | 4.5 |
| 20 | 5 |
| 10 | 5 |

Figure 3:
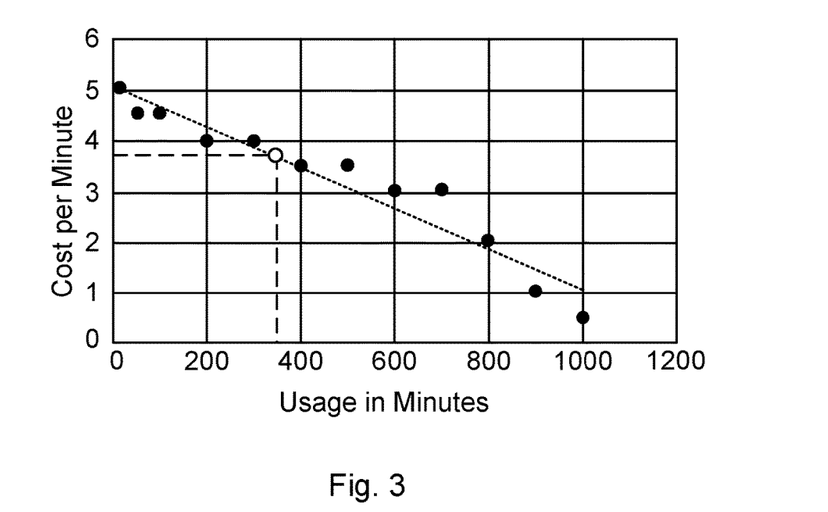
FIG. 3 is a schematic diagram illustrating a linear regression with customer fit.

The linear regression model is prepared for the above data set as shown in FIG. 3. The linear regression has the following equation: y=−0.004x+5.0528, wherein $R^2$=0.9334.

Considering a user in $C_{1\ldots n}$ (t) having a usage of 350 will derive an optimal value of 3.65 (shown as a hollow circle in FIG. 3). This means that the personalized product will have a cost of 3.65 per minute that will be offered to the customer under analysis.

An identified personalized product is offered to the user through any contact channels or through a customer invoice. Once the customer accepts, the plan is provisioned in the BSS.

Figure 4:
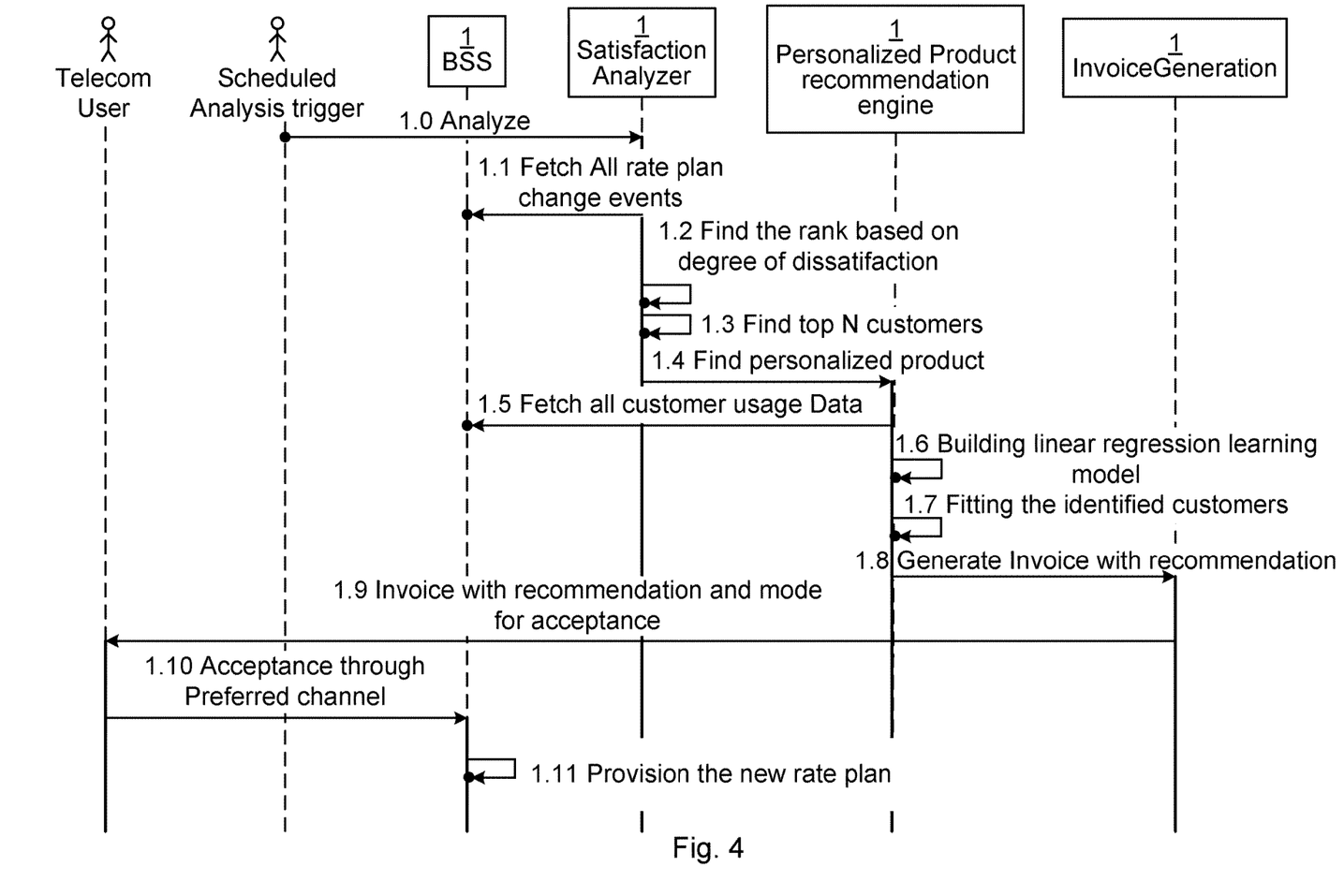
FIG. 4 is a sequence diagram illustrating an end-to-end sequence according to an embodiment presented herein.

An end-to-end sequence is illustrated in connection to FIG. 4.

In step 1.0 a trigger activates a process of finding dissatisfied users, by contacting the satisfaction analyser. An operator may trigger this manually or in an automated process, or it may be an automatic trigger within the satisfaction analyser.

In step 1.1 the satisfaction analyser fetches all the rate plan change events for a fixed time period from the BSS. The fixed time period may be a number of months, such as e.g. 3, 6 or 12 months.

In step 1.2 the satisfaction analyser ranks users based on degree of dissatisfaction.

In step 1.3 the satisfaction analyser finds top-N users, wherein N may be configured by the telecommunication operator. With 1000 users identified as dissatisfied, N may e.g. be selected to 300, meaning that the top 300 will be selected for the offering of a the personalized product.

In step 1.4, the top-N dissatisfied users are send to, or triggered in, the personalized product recommendation engine.

In step 1.5 the personalised product recommendation engine fetches all user usage data from the BSS.

Based on the usage data, the personal product recommendation engine, in step 1.6, builds a linear regression learning model.

The top-N user are then, in step 1.7, fit into the linear regression to find the optimal best fit rate plan for each of the respective user.

In step 1.8 information about each personalised product recommendation, together with recommendations and savings, are then sent to each respective user through the invoice generation.

In step 1.9 the invoice generation generates invoice with recommendation and mode for accepting this recommendation, and sends it the each respective user of the top-N users.

Each user conveys acceptance, through a preferred channel, to the BSS in step 1.10.

In step 1.11 the BSS provisions this personalized rate plan.

Figure 5:
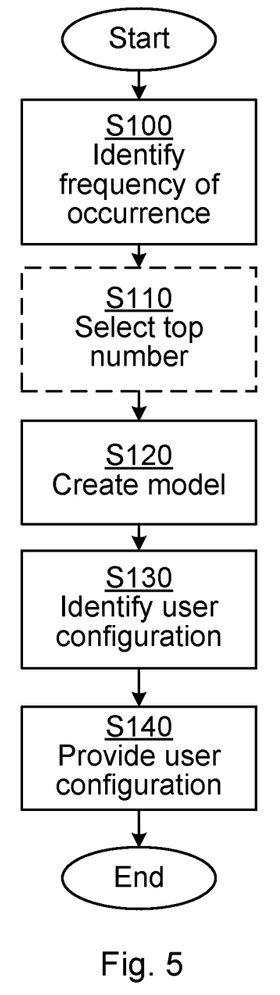
FIG. 5 is a flow chart illustrating a method for an embodiment presented herein.

An embodiment of a method for determining user configurations of services in a radio communication network is presented with reference to FIG. 5. The method is performed in a support system node 1 and comprises ranking S100 users of a service based on frequency of occurrences of user reconfiguration in the radio communication network, creating S120 a linear regression model of user configuration for a plurality of users of the service in the radio communication network, identifying S130 a user configuration per user of the service for a selected number of ranked users by fitting the selected number of ranked users in the linear regression model, in order to reduce user reconfiguration of the service, and providing S140 the identified user configuration per user to the selected number of ranked users.

The method may further comprise selecting S110 a number of users based on the ranked frequency of occurrences. The selecting step may be performed in an analyser unit.

The services may be product offerings.

The linear regression model may be created for user configuration for all users of the service in the radio communication network.

The frequency of occurrences may be obtained from a BSS.

The ranking step may be performed in an analyser unit.

The creating and identifying steps may be performed in a user configuration engine.

The providing step may send the identified user configuration per user to a service generator for transmission to the selected users.

Figure 6:
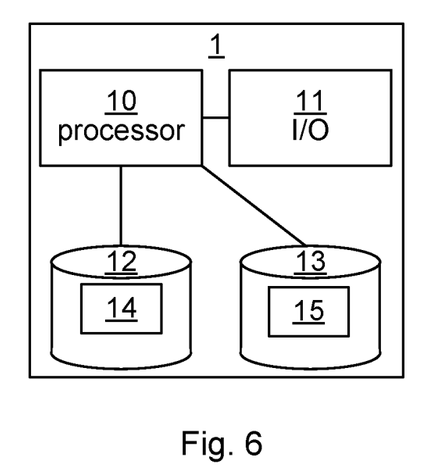
FIG. 6 is a schematic diagram illustrating some components of a device presented herein.

An embodiment of a support system node for determining user configurations of services in a radio communication network is presented with reference to FIG. 6. The support system node 1 comprises a processing circuitry 10 and a computer program product 12, 14 storing instructions 13, 15 that, when executed by the processing circuitry, causes the support system node to rank users of a service based on frequency of occurrences of user reconfiguration in the radio communication network, create a linear regression model of user configuration for a plurality of users of the service in the radio communication network, identify a user configuration per user of the service for a selected number of ranked users by fitting the selected number of ranked users in the linear regression model, in order to reduce user reconfiguration of the service, and to provide the identified user configuration per user to the selected number of ranked users.

The support system node may further be caused to select a number of users based on the ranked frequency of occurrences. The select step may be performed in an analyser unit.

The services may be product offerings.

The linear regression model may be created for user configuration for all users of the service in the radio communication network.

The frequency of occurrences may be obtained from a BSS.

The rank step may be performed in an analyser unit.

The create and identify steps may be performed in a user configuration engine.

The provide step may send the identified user configuration per user to a service generator for transmission to the selected users.

FIG. 6 is a schematic diagram showing some components of the system support node 1. The processing circuitry 10 may be provided using any combination of one or more of a suitable central processing unit, CPU, multiprocessing circuitry, microcontroller, digital signal processing circuitry, DSP, application specific integrated circuit etc., capable of executing software instructions of a computer program 14 stored in a memory. The memory can thus be considered to be or form part of the computer program product 12. The processing circuitry 10 may be configured to execute methods described herein with reference to FIG. 5.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processing circuitry 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the system support node 1.

The system support node 1 may further comprise an input/output (I/O) interface 11 including e.g. a user interface. The system support node 1 may further comprise a receiver configured to receive signalling from other nodes, and a transmitter configured to transmit signalling to other nodes (not illustrated). Other components of the base station 2 are omitted in order not to obscure the concepts presented herein.

Figure 7:
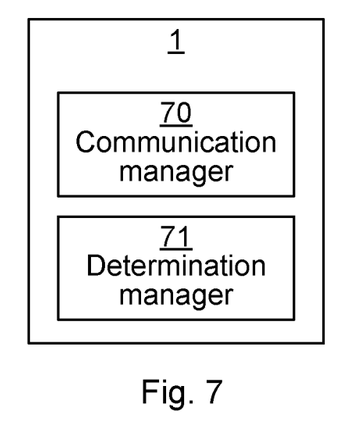
FIG. 7 is a schematic diagram illustrating functional modules of a device presented herein.

A system support node 1 for determining user configurations of services in a radio communication network is presented with reference to FIG. 7. The system support node 1 comprises an communication manager 70 for providing S140 the identified user configuration per user to the selected number of ranked users, and a determination manager 71 for ranking S100 users of a service based on frequency of occurrences of user reconfiguration in the radio communication network, creating S120 a linear regression model of user configuration for a plurality of users of the service in the radio communication network, and for identifying S130 a user configuration per user of the service for a selected number of ranked users by fitting the selected number of ranked users in the linear regression model, in order to reduce user reconfiguration of the service.

FIG. 7 is a schematic diagram showing functional blocks of the system support node 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the method illustrated in FIG. 5, comprising a communication manager unit 70 and a determination manger unit 71. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manager 70 is for determining user configurations of services in a radio communication network. This module corresponds to the step S140 of FIG. 5. This module can e.g. be implemented by the processing circuitry 10 of FIG. 6, when running the computer program.

The determining manger 71 is for determining user configurations of services in a radio communication network. This module corresponds to the steps S100, S110, S120, and S130 of FIG. 5. This module can e.g. be implemented by the processing circuitry 10 of FIG. 5, when running the computer program.

A computer program 14, 15 for determining user configurations of services in a radio communication network is presented with reference to FIG. 6. The computer program comprises computer program code which, when run in a system support node 1, causes the system support node to rank users of a service based on frequency of occurrences of user reconfiguration in the radio communication network, create a linear regression model of user configuration for a plurality of users of the service in the radio communication network, identify a user configuration per user of the service for a selected number of ranked users by fitting the selected number of ranked users in the linear regression model, in order to reduce user reconfiguration of the service, and to provide the identified user configuration per user to the selected number of ranked users.

A computer program product 12, 13 comprising a computer program 14, 15 and a computer readable storage means on which the computer program 14, 15 is stored, is also presented.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

The invention claimed is:

1. A method for determining user configurations of services in a radio communication network, the method being performed in a support system node, and comprising:
 ranking users of a service based on frequency of occurrences of user reconfiguration in the radio communication network;
 creating a linear regression model of user configuration for a plurality of users of the service in the radio communication network;
 identifying a user configuration per user of the service for a selected number of ranked users by fitting the selected number of ranked users in the linear regression model, in order to reduce user reconfiguration of the service; and
 providing the identified user configuration per user to the selected number of ranked users.

2. The method according to claim 1, further comprising: selecting a number of users based on the ranked frequency of occurrences.

3. The method according to claim 2, wherein the selecting step is performed in an analyser unit.

4. The method according to claim 1, wherein the services are product offerings.

5. The method according to claim 1, wherein the linear regression model is created for user configuration for all users of the service in the radio communication network.

6. The method according to claim 1, wherein the frequency of occurrences is obtained from a business support system, BSS.

7. The method according to claim 1, wherein the ranking step is performed in an analyser unit.

8. The method according to claim 1, wherein the creating and identifying steps are performed in a user configuration engine.

9. The method according to claim 1, wherein the providing step sends the identified user configuration per user to a service generator for transmission to the selected users.

10. A support system node for determining user configurations of services in a radio communication network, the support system node comprising:
 a processing circuitry; and
 a computer program product storing instructions that, when executed by the processing circuitry, causes the support system node to:
 rank users of a service based on frequency of occurrences of user reconfiguration in the radio communication network;
 create a linear regression model of user configuration for a plurality of users of the service in the radio communication network;
 identify a user configuration per user of the service for a selected number of ranked users by fitting the selected number of ranked users in the linear regression model, in order to reduce user reconfiguration of the service; and
 provide the identified user configuration per user to the selected number of ranked users.

11. The support system node according to claim 10, further caused to:
 select a number of users based on the ranked frequency of occurrences.

12. The support system node according to claim 11, wherein the select step is performed in an analyser unit.

13. The support system node according to claim 10, wherein the services are product offerings.

14. The support system node according to claim 10, wherein the linear regression model is created for user configuration for all users of the service in the radio communication network.

15. The support system node according to claim 10, wherein the frequency of occurrences is obtained from a business support system, BSS.

16. The support system node according to claim 10, wherein the ranking step is performed in an analyser unit.

17. The support system node according to claim 10, wherein the create and identify steps are performed in a user configuration engine.

18. The support system node according to claim 10, wherein the provide step sends the identified user configuration per user to a service generator for transmission to the selected users.

19. A computer program product for determining user configurations of services in a radio communication network, the computer program product comprising a non-transitory computer readable storage medium that stores computer program code which, when run in a support system node causes the support system node to:
 rank users of a service based on frequency of occurrences of user reconfiguration in the radio communication network;

create a linear regression model of user configuration for a plurality of users of the service in the radio communication network;

identify a user configuration per user of the service for a selected number of ranked users by fitting the selected number of ranked users in the linear regression model, in order to reduce user reconfiguration of the service; and provide the identified user configuration per user to the selected number of ranked users.

* * * * *